Jan. 5, 1971 E. FUGLSANG-MADSEN Re. 27,022

CASING WITH APPERTAINING REFILL SHELL FOR LIPSTICKS AND OTHER POMADE STICKS

Original Filed Aug. 30, 1966

INVENTOR

Erik Fuglsang-Madsen

BY Spencer & Kaye

ATTORNEYS

United States Patent Office

Re. 27,022
Reissued Jan. 5, 1971

27,022

CASING WITH APPERTAINING REFILL SHELL FOR LIPSTICKS AND OTHER POMADE STICKS

Erik Fuglsang-Madsen, Saxtorp, Sweden, assignor, by mesne assignments, to Sebec S.A., Fribourg, Switzerland, a Swiss company Original No. 3,393,036, dated July 16, 1968, Ser. No. 576,123, Aug. 30, 1966. Application for reissue Sept. 10, 1969, Ser. No. 862,992
Claims priority, application Denmark, Aug. 31, 1965, 4,472/65
Int. Cl. A45d *40/06*
U.S. Cl. 401—78 13 Claims

Matter enclosed in heavy brackets [ ] appears in the original patent but forms no part of this reissue specification; matter printed in italics indicates the additions made by reissue.

ABSTRACT OF THE DISCLOSURE

A pomade stick container having a removable pomade refill. The container includes a casing having an upper portion provided with an inwardly extending flange the inner diameter of which defines the outlet opening of the container, a slide arranged to move within the casing, manually operable means connected to the slide for displacing the slide within the casing and the pomade refill itself. The refill includes a refill shell which is closed at its upper end and has a lower portion defining an entry to the shell, a detachable stick carrier closing the shell entry and adapted to hold a pomade stick extending into the refill shell. The stick carrier includes a lower carrier portion provided with a first connecting means. The slide is provided with a second connecting means adapted to be interconnected with the first connecting means so that the slide and the stick carrier may be joined when the two are pressed towards each other inside the casing. The stick carrier is also provided at its upper end with a narrowed portion adapted to be engaged by the lower portion of the refill shell. The major diameter of the stick carrier is smaller than the inner diameter of the flange whereas the major diameter of the lower portion of the refill shell is larger than the inner diameter of the flange. Either the lower portion of the refill shell or the flange, or both, are made of a material so yieldable that the major part of the refill shell may be pressed into the casing through the flange. A release member is arranged within the casing, at least during use, which, when operated, is adapted to release the stick carrier from the slide.

Figure 1:
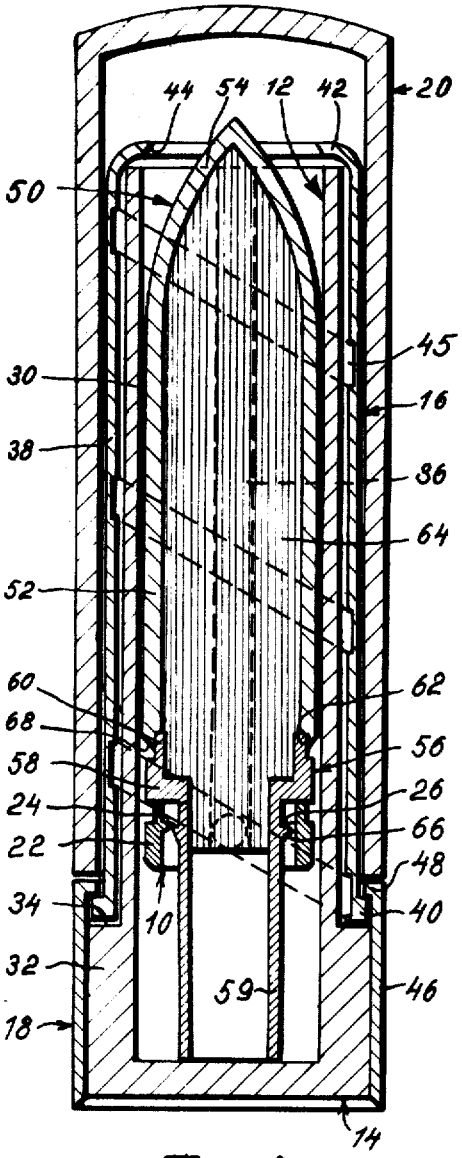

This invention relates to a casing with appertaining refill shell, closed at its top end, for lipsticks and other pomade sticks, comprising a casing part provided with an inwardly extending flange limiting the outlet opening of the casing for the pomade stick, and an upwards and downwards displaceable slide. The refill shell is closed at its lower end by a detachable stick carrier to which the stick is attached and which is adapted to be connected detachably to the slide. The major outer diameter of the stick carrier is smaller than the inner diameter of the flange; the stick carrier is provided at its top end with a narrowed portion engaged by the lower end of the refill shell which, at this lower end has an outer diameter larger than the inner diameter of the flange.

Casings for pomade sticks are known which have a cylindrical refill shell and a stick carrier adapted to be firmly connected to the regular casing to permit the carrier to extend; that is, during use to enable the carrier with the pomade stick to be displaced upwards out of the refill shell and back into the same. Such a combined pomade casing has such a great length, however, that it cannot be placed in a smaller vanity bag of the type, for example, used in theaters. The necessary refill shell is also relatively expensive to manufacture since it has to be strong and is preferably further made as a decorative shell.

Casings with an appertaining refill shell are also known wherein the diameter of the carrier is less but the other diameter of the refill shell is greater than the inner diameter of the casing stick opening. When such a refill shell is placed above the casing, the carrier thereof brought to engage the displaceable slide of the casing and the slide displaced downwards into the casing, the pomade stick will be drawn out of the refill shell and into the casing without the danger of damage to the soft pomade material during the removal from the shell. On the other hand it will later on be difficult, without destroying the stick, to return the latter to the refill shell. This replacement, in many cases, may be desirable, for example, when, at the last moment, a customer regrets her change of color or when a user wishes to use the same casing in connection with a number of sticks of different colors. Further, like all other pomade casings on the market, this known casing suffers from the drawback that, when the casing is originally sold, the stick is arranged therein without any protection other than that provided by the casing itself. This means, among other things, that, during storage, the stick is exposed to the influence of the air; that is, in addition to the decomposition of some of the components of the stick through oxidation, the stick is subject to the attacks of microbes for which most pomades are excellent nutrients. The danger of microbes is further increased since, in many shops, the necessary color test is carried out by means of the sticks in the casings. The purchaser cannot be sure, therefore, that the stick has not previously been touched by one or more hands and thereby infected with microbes.

An object of the present invention is to provide a stick casing, having a refill shell associated therewith which ensures, in a simple manner, that the customer will know whether or not the stick has previously been tried.

A further object of the present invention is to provide a stick casing, having a refill shell associated therewith, which provides the possibility of transferring the stick from the refill shell to the casing and back again from the casing to the refill shell without any danger of the stick being damaged.

According to the present invention, in connection with a casing of the type concerned, these as well as other objects are achieved by providing a casing wherein the flange and/or the lower end of the refill shell is made of a material so yieldable that the greatest part of the length of the refill shell may be pressed into the casing through the flange; wherein the connection between the stick carrier and the slide is such that it may be established by the stick carrier and the slide being pressed towards each other; and wherein, at least during the use of the casing, a release member is arranged within the casing in such a manner that it is adapted by a release operation to release the stick carrier from the slide.

In such a casing owing to the yieldability of the flange and/or the lower end of the shell it is possible, by pushing on the shell, to press it into the casing and, by a sufficient heavy push on the shell, to ensure the connection between the stick carrier and the slide. Thus the stick is well protected by the shell until it has to be used for the first time. When it is desired to use the stick, the stick, together with the refill shell, is moved out of the casing by means of the slide until the lower edge of the shell is above the flange. When the slide is then displaced downwards again, it will pull with it only the stick carrier and the stick. The pull between the shell and stick will be so slight that even if it suffices to limit the separation to a gradual drawing out of the stick from the shell, it is not able to draw the latter back into the casing. When the pomade stick has been drawn into the casing and out of the shell, the latter may be removed.

If, before it is consumed, the stick has to be exchanged with another stick of other composition or color, the stick is displaced to its bottom position within the casing by means of the slide and the refill shell pressed a little bit into the casing. Since the shell is guided by the casing, it will be exactly centered relative to the stick. Then, by means of the release member, the connection between the carrier and the slide is released and the slide displaced upwards taking along the carrier and thereby the stick. The stick is pushed into the shell which is retained and centered relative to the stick by the casing. The pushing of the stick into the shell can thus be carried out without danger of the stick being damaged. When the stick is entirely inside the shell, the latter will, engage the carrier and will together with the carrier, be pushed out of the casing. The shell together with the stick and carrier now contained therein can then be removed from the casing and stored. Provided the shell is transparent, it will always be easy to control that the stick is reinserted in the shell.

When the stick is used up, the connection between the slide and the carrier may be released by means of the release member. The carrier may then be pushed out of the casing by means of the slide and directly shaken off into a waste receiver. This can be done without touching the carrier which, at this time, normally is covered with a thin layer of pomade material.

Figure 2:
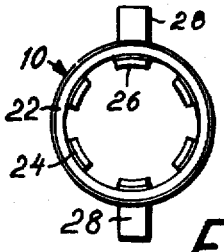
Figure 4:
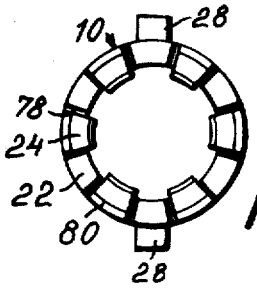
Figure 3:
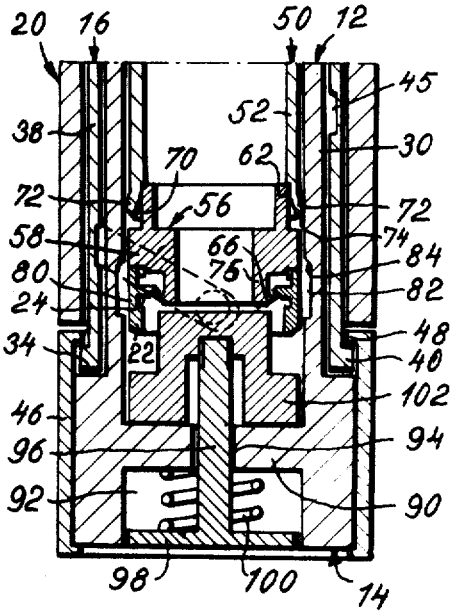

Further features, objects, and advantages of the invention will more fully appear from the following description to be read in connection with the accompanying drawings, in which:

FIG. 1 is an enlarged longitudinal sectional view of an embodiment of a lipstick casing with the associated refill shell embodying the invention, FIG. 2 is an enlarged bottom view of a slide constituting a part of the casing shown in FIG. 1, FIG. 3 is an enlarged longitudinal sectional view of the lower end of another lipstick casing embodying the invention, and FIG. 4 is an enlarged top view of a slide constituting a part of the casing shown in FIG. 3.

The casing shown in FIGS. 1 and 2 comprises a slide 10, an inner sleeve 12 provided with a base portion 14, an outer sleeve 16, a retaining ring 18, and a slip cap 20.

The slide 10, slidably arranged within the inner sleeve 12, comprises a ring member 22 provided with a number of inwardly extending segment-like retainer flaps 24 the inner edges of which are wedge-shaped. On its outer side the ring member 22 is provided with two cylindrical projections or lugs 28 arranged diametrically opposite each other. The inner sleeve 12 comprises a cylindrical thin-walled portion 30 continuing at its lower end into the somewhat thicker outer wall 32 of the cup-shaped base portion 14. The upper edge 34 of the outer wall 32 constitutes a thrust face surrounding the lower end of the cylinder portion 30. The cylinder portion 30 is provided with two oppositely arranged longitudinal extending slots 36 of which only one is shown in the drawings. The lugs 28 of the slide 10 extend through one each of the two slots 36.

The outer sleeve 16 is provided with a cylindrical wall 38 the inner diameter of which is slightly larger than the outer diameter of the cylinder portion 30 of the inner sleeve 12. The cylindrical wall 38 is at its lower end provided with an outwardly extending annular supporting flange 40 having an outer diameter slightly smaller that the outer diameter of the base portion 14 and a lower face directed toward the thrust face 34. At its upper end the cylinder wall 38 is formed to provide an inwardly extending flange 42 covering the upper edge of the cylinder portion 30 of the inner sleeve 12. The inner edge face 44 of the flange 42 is tapered upwards and has a minor diameter smaller than the inner diameter of the inner sleeve 12. The outer sleeve 16, or at least the part thereof comprising the flange 42, is made of a relatively yieldable material, for example from a soft polypropylene.

On its inner side the cylindrical wall 38 is provided with two oppositely arranged screw tracks 45 engaged by one each of the lugs 28 of the slide 10. By rotation of the base portion 14 with the inner sleeve 12 relative to the outer sleeve 16, therefore, the slide 10 may be displaced upwards or downwards within the inner sleeve 12.

The outer sleeve 16 is rotatably, but non-slidably retained on the inner sleeve 12 by means of the retaining ring 18 which is provided with a cylindrical wall 46 adapted to grip closely around the outer side of the base portion 14 and at its upper end provided with an inwardly extending flange 48 gripping above the upper side of the flange 40 of the outer sleeve 16, but having an inner diameter slightly larger than the outer diameter of the cylindrical wall 38.

To the casing shown belongs a refill shell 50 which may be made of a suitably transparent and relatively tough material, for example polystyrene. The shell 50 comprises a cylindrical wall 52 having an outer diameter slightly smaller than the inner diameter of the inner sleeve 12, but larger than the minor inner diameter of the flange 42. The wall 52 continues at the top into a closed tapered tip portion 54.

The shell 50 is at its lower end closed by means of a stick carrier 56 comprising a ring portion 58 having an angular cross section and an outer diameter slightly smaller than or equal to the minor inner diameter of the flange 42. An extractor cylinder 59 extends downwards from the lower end of the ring portion 58. The lower edge of this cylinder, by contacting the bottom of the base portion 14, determines the bottom position of the carrier 58 within the inner sleeve 12. A cylindrical flange 60 having an outer diameter smaller than the outer diameter of the ring portion 58 extends upwards from the latter into an inner recess 62 which is provided at the lower end of the shell wall 52 and is adapted to jamb onto the cylindrical flange 60. The depth of the recess 62 reckoned from the lower edge of the wall 52 is smaller than the height of the cylindrical flange 60.

A lipstick 64 fixed to the carrier 56 extends upwards into the refill shell 50.

In a distance from the ring portion 58 corresponding to the distance between the upper edge of the ring portion 22 of the slide 10 and the lower side of its retainer flaps 24 the extractor cylinder 59 is provided with an outer peripheral retaining rib 66 having a downwardly tapered conical outer side. The major outer diameter of the retaining rib 66 is somewhat larger than the inner diameter of the opening limited by the inner edges 26 of the flaps 24.

The refill shell 50 together with the stick carrier 56 and the lipstick 64 constitutes a special refill unit to be separately sold. Possibly, a number of such refill shells with lipsticks of different colors may be sold in a collection box comprising a bottom member provided with a number of holes in which the extractor cylinders of the carriers of the different shells may be inserted.

When a lipstick has to be put into the regular casing 10–18, the slide 10 is screwed to a position slightly above the one shown in FIG. 1. Then the refill unit is pushed down into the casing. At first, the stick carrier 56 may be inserted into the inner sleeve 12 without resistance since the outer diameter of the carrier is at most equal to the minor inner diameter of the flange 42. Then a push is exerted on the tip of the shell 50 until, in spite of the fact that the outer diameter of the shell is larger than the minor inner diameter of the flange 42, the shell 50 is pressed into the inner sleeve 12. This is possible because of the yieldability of the flange 42. The insertion may be facilitated when, as shown, the outer wall 52 of the shell 50 has a downwardly conically tapered lower outer edge 68. When the refill shell has been pressed into the inner sleeve 12 so far that its upper tapered portion 54 is situated opposite the flange 42 the insertion of the shell is no longer resisted. Now, however, the retaining flange 66 engages the flaps 24 of the slide 10; but, upon a further push on the tip of the refill shell 50, because the flaps 24 are somewhat flexible, the shell will be pushed down below the flaps. The shell 56 will then be connected to the slide 10.

Later on, when the lipstick 64 has to be used, the slide 10 is screwed upwards and the refill shell 50 pressed out through the opening defined by the flange 42. When the shell has been pushed totally out of the opening, the flange 42 will again take up its normal position, and, consequently, a subsequent screwing down of the slide 10 results in engagement between the lower edge of the refill shell 50 and the upper side of the flange 42. When then the slide 10 is screwed further downwards, the slide will take with it the stick carrier 56 with the stick 64, since the resistance against this movement due to clamping of the shell to the cylindrical flange 60 of the carrier and to the possible adherence of the lipstick to the inner side of the shell 50 will be essentially smaller than the resistance provided by the flange 42 against the drawing of the refill shell 50 through the flange 42.

In case, later on, it is desired again to remove the lipstick from the casing for storing it within the shell 50, the slide 10 is screwed downwards to the position shown in FIG. 1, and the refill shell 50 manually pressed through the flange 42 into the inner sleeve 12. The shell 50 will thereby be centered within the inner sleeve 12 and thus also relative to the lipstick 64 itself, and will simultaneously be held by the inner sleeve 12. Thereafter, the slide 10 is screwed still somewhat downwards, but, because of the extractor cylinder 59, the stick carrier 56 is not able to participate in this displacement of the slide 10. The flaps 24 are therefore drawn downwards past the retaining flange 66, so that, during a following upward screwing of the slide 10, the flaps 24 engage below the retaining flange 66 and push the stick carrier 56, together with the lipstick 64, upwards into the shell 50. When the stick carrier 56 engages the shell 50, the latter will grasp the flange 60 of the carrier and then, together with the carrier, be pushed out of the regular casing 10–18.

In connection with the lipstick casing shown in FIGS. 3 and 4, the wall 52 of the refill shell 50 is provided, below the recess 62, with an extension 70 outwardly limited by means of a wall portion 72, which may be slitted, if desired, which has a major outer diameter slightly larger than the inner diameter of the inner sleeve 12 and which is provided with an inwardly and downwardly tapered lower edge 74. As long as the refill shell 50 remains within the inner sleeve 12, said wall portion 72 will be somewhat compressed, but not so much as to cause any considerable friction between the wall portion 72 and the cylindrical wall 30 of the inner sleeve 12. On the other hand, when the lower edge of said wall portion 72 is situated above the flange 42, the wall portion 72 will expand and thereby further ensure that only when influenced from the outside can the refill shell 50 be put into the inner sleeve 12.

*The expansion of the wall portion 72 occuring when the lower end of the shell is moved clear of the flanges 42 also results in a lessening of the friction forces holding the shell on the flange 60, so that the shell can be removed easily from the carrier 56 either with the fingers or by retracting the carrier into the casing. In this way, the protective shell 50 is readily removed by the user without damage to the pomade stick, a troublesome problem in prior art devices.*

In this embodiment the stick carrier 56 is provided, instead of the extractor cylinder 59, with a downwards extending relatively short cylindrical member 75 provided at its lower edge with the retaining flange 66.

Further in this embodiment, the retainer flaps 24 of the slide 10 are relatively stiff but are formed on relatively thin-walled vertically extending supporting fins provided in the ring portion 22 by means of vertically extending slots 78 and only connected to the ring portion 22 itself at their lower ends. Thus the supporting fins are able to pivot outwards relative to the ring portion 22. The inner side of the inner sleeve 12 is provided opposite the supporting fins 80, when the slide 10 takes up its lowermost position shown, with a peripheral slot 82 upwardly limited by a tapered wall face 84. When the cylindrical portion 75 of the carrier 56 is pushed down into the slide 10 and its retaining flange 66 engages the retainer flaps 24, said flaps will push the supporting fins 80 outwards into the slot 82 so that the retaining flange 66 is able to pass the retainer flaps 24 and take up a position immediately below the flaps 24. Then, owing to their elasticity, the supporting fins 80 will again pivot inwards so that the retaining flaps 24 will grip above the retaining flange 66. In case, however, this springing back of the fins is prevented for any reason, when the slide 10 is subsequently screwed upwards, the supporting fins 80 will be pushed inwards again by the upper tapered wall 84 of the slot 82. The inner wall of the inner sleeve 12 will then prevent them from again pivoting outwardly. Consequently, as long as the slide 10 is in a position above its lowermost position, the carrier 56 is securely forced to follow the movements of the slide 10 upwards as well as downwards.

In this embodiment the bottom 90 of the base portion 14 is arranged at a distance above the lower side of the base portion forming a downwardly open recess 92. The bottom 90 is provided with a center hole for a vertically displaceable stud 96 provided at its lower end with a head 98 having an outer diameter somewhat smaller than the inner diameter of the recess 92. A pressure spring 100 is inserted between the head 98 and the bottom 90.

The portion of the stud 96 above the bottom 90 is provided with an extractor 102 the lower side of which ensures, by engagement with the bottom 90, that, in the normal position shown, the lower side of the head 98 is level with the lower side of the base portion 14. The extractor 102 has a height such that, in the position shown, its upper side is arranged a short distance from the lower side of the cylindrical portion 75 of the stick carrier 56.

From the drawing it easily appears that when the slide 10 is at its lower position as shown, the stick carrier 56 may be pushed upwards relative to the slide 10 when the head 98 is pushed upwards from below a distance such that the retaining flange 66 is displaced to a position above the retainer flaps 24. When the slide 10 is now again moved upwards, the retainer flaps 24 will then engage the lower side of the retaining flange 66 without possibility of passing the retaining flange.

It is thus ensured that if the slide 10 is further screwed upwards, the stick carrier will be pushed out of the casing 10–22 without attaching itself to the slide 10.

The invention is not limited to the embodiments shown since, within the scope of the following claims, the embodiments may be varied in many different ways. Thus the connection between the slide 10 and the stick carrier 56 may be provided in many other ways than those shown. Many other releasable retaining means between the two members may be also used instead of the means shown in FIGS. 3 and 4. Further the stick carrier 56 may be formed in many other ways than shown.

In connection with pomade or stick material which, upon molding, only contracts a small degree when it hardens, stick carriers may be used which are formed as feeding heads for the pomade stick so that the stick may be molded directly in the refill shell 50. However, many pomade stick substances have such a high degree of contraction during hardening that if they were molded directly in the shell, large areas of the material would slip away from the inner face of the shell resulting in a less attractive appearance. Therefore, it is most suitable that sticks of such substances be molded independent of the shell and later inserted therein. In this case, however, the stick carrier may be used as a feeding head so that, already during molding, the stick is fixed to the carrier.

I claim:

1. A stick casing with appertaining refill shell comprising in combination a casing part having an upper portion provided with an inwardly extending flange having an inner diameter and defining an outlet opening of said casing, a slide displaceably arranged within said casing, operating means connected to said slide and adapted by manual operation to displace said slide within said casing, said refill shell being closed at its upper end and comprising a lower portion defining an entry to said refill shell, said entry being closed by a detachable stick carrier adapted to have a stick attached thereto extending into said refill shell, said stick carrier having a lower carrier portion provided with first connecting means, said slide being provided with second connecting means, said two connecting means being adapted to be interconnected when pressed towards each other inside said casing for interconnecting said stick carrier and said slide, said stick carrier having a major diameter smaller than said inner diameter of said flange, said stick carrier being provided at its upper end with a narrowed portion adapted to be engaged by said lower portion of said refill shell, said lower portion having a major diameter larger than said inner diameter of said flange, said flange constituting a first element, said lower portion of said refill shell constituting a second element, at least one of said two elements being made from a material so yieldable, that the greatest part of said refill shell may be pressed into said casing through said flange, a release member being arranged within said casing at least during the use thereof, said release member being adapted by a release operation to release said stick carrier from said slide.

2. A stick casing with appertaining refill shell as defined in claim 1, said flange being the said element made of a yieldable material, said lower portion of said refill shell being provided at its lower end with a conically tapered end portion, said end portion having a major diameter larger than and a minor diameter smaller than said inner diameter of said flange.

3. A stick casing with appertaining refill shell as defined in claim 2, said flange having an inner edge, said inner edge being widening from above and downwards.

4. A stick casing with appertaining refill shell as defined in claim 1, said stick carrier being provided with a downwardly extending extension serving as said release member, said casing being provided with an inner stopper for said extension thereby defining the lowermost position of said stick carrier within said casing, said slide being displaceable from an upper position near said outlet opening to a position below the one, at which said stick carrier, when interconnected with said slide takes up its said lowermost position.

5. A stick casing with appertaining refill shell as defined in claim 1, said casing having a lower casing portion, an extractor serving as said release member being arranged in said lower casing portion accessible from the outside of said casing, said extractor being displaceable upwards in the longitudinal direction of said casing from a lower position in which its upper end at the highest just contacts said carrier, when said carrier takes up its lowermost position in said casing, said extractor being adapted when displaced upwards from its said lowermost position to engage said carrier for releasing said stick carrier from said slide.

6. A stick casing with appertaining refill shell as defined in claim 5, a spring arranged within said casing contacting said extractor for urging the same in downward direction towards its said lowermost position.

7. A stick casing with appertaining refill shell as defined in claim 5, said second connecting means on said slide being constituted by axially extending pivotable fins comprising inwardly extending retainer flaps, said first connecting means on said stick carrier being constituted by side projections on said stick carrier, said retainer flaps being adapted to retain said side projections, said casing comprising an inner guide portion for guiding said slide, said guide portion being provided opposite said slide, when the latter takes up its lower position, with recesses, said recesses being adapted to receive said pivotable fins when said fins in last said position of said slide are pivoted outwards.

8. Casing with appertaining refill shell as defined in claim 7, said recesses being constituted by a circular groove.

9. A stick casing with appertaining refill shell as defined in claim 1, said casing being provided with an inner sleeve arranged within said casing part, said slide being displaceably arranged within said inner sleeve, said inner sleeve having an inner diameter at least equal to said major outer diameter of said refill shell.

10. A refill [shell] *unit* for *pomade* stick casings *or the like* comprising, *in combination, a generally tubular shell* having a closed upper end and a lower portion defining an entry to said shell and having an inner side, a stick carrier [adapted to close] *removably received within* said entry, said stick carrier being provided at its upper end with a narrowed portion [adapted to engage said lower portion of said refill shell], said inner side being provided with a recess extending in the longitudinal direction of said shell smaller than the height of said narrowed portion of said stick carrier, said recess having an upper end, the inner dameter of which corresponds to the outer diameter of said narrowed portion of said stick carrier[,] *whereby, upon insertion of said narrowed portion through said entry, said narrowed portion frictionally engages said inner side to retain said shell and said stick carrier together,* said lower portion *of the shell* being [provided with an extension, below said recess, which is] outwardly limited by a wall constituting the lowermost end of said shell, said wall having a major outer diameter larger than the outer diameter of the portions of said shell above said wall [, said wall] and being provided with a downwardly and inwardly inclined lower edge.

11. A refill shell *assembly* as defined in claim 10, *in which* said wall [being slit] *is slitted to form flexible extensions.*

*12. The combination comprising a hollow shell having an open end and a closed end, the portion of the shell wall adjacent the open end being slitted to form flexible extensions and having a circumferentially recessed, inner surface, and a carrier having a collar portion removably received within the open end of the shell and adapted to*

*hold a pomade stick or the like, the collar portion being dimensioned to make frictional engagement with the recessed inner surfaces of the flexible extensions to retain the shell and carrier in connected relation, the flexibility of the extensions permitting lateral distortion of the extensions to allow the shell to be readily separated from the carrier.*

*13. The combination of claim 12 further comprising a sleeve having an open end and receiving the connected carrier and shell,*

*the minor inner dimension of the sleeve being slightly smaller than the major outer dimension of the slitted wall portion of the shell so that, upon movement of the shell and carrier through the open end of the sleeve, the flexible extensions engage the inner wall of the sleeve and are thereby pressed more tightly into gripping engagement with the collar portion of the carrier and, upon movement of the connected carrier and shell out of the sleeve to the extent that the slitted wall portion of the shell is clear of the sleeve, the flexible extensions expand relieving substantially the gripping engagement between the extensions and the outer portion of the carrier to facilitate removal of the shell from the carrier.*

References Cited

The following references, cited by the Examiner, are of record in the patented file of this patent or the original patent.

UNITED STATES PATENTS

| | | | |
|---|---|---|---|
| 2,698,085 | 12/1954 | Schall | 206—56 |
| 2,921,675 | 1/1960 | Clark et al. | 206—56 |
| 3,162,304 | 12/1964 | Bau | 206—56 |

FOREIGN PATENTS

| | | | |
|---|---|---|---|
| 1,187,211 | 3/1959 | France | 206—56 |
| 58,427 | 9/1937 | Norway | 206—56 |

LAWRENCE CHARLES, Primary Examiner